(12) United States Patent
Parizy et al.

(10) Patent No.: US 8,521,872 B2
(45) Date of Patent: Aug. 27, 2013

(54) COMPUTER PRODUCT, VERIFICATION SUPPORT APPARATUS, AND VERIFICATION SUPPORT METHOD

(75) Inventors: Matthieu Parizy, Kawasaki (JP); Hiroaki Iwashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 13/064,901

(22) Filed: Apr. 25, 2011

(65) Prior Publication Data

US 2012/0005335 A1     Jan. 5, 2012

(30) Foreign Application Priority Data

Jul. 2, 2010   (JP) .................................. 2010-152258

(51) Int. Cl.
*G06F 15/173*     (2006.01)
(52) U.S. Cl.
USPC ............................................. 709/224; 702/1
(58) Field of Classification Search
USPC ................. 714/39, 47.1–47.3; 340/1.1–16.1; 709/224
See application file for complete search history.

(56) References Cited

U.S. PATENT DOCUMENTS

| | | | | |
|---|---|---|---|---|
| 2005/0192098 | A1* | 9/2005 | Guo et al. | 463/42 |
| 2008/0080551 | A1* | 4/2008 | Driscoll et al. | 370/465 |
| 2008/0247357 | A1* | 10/2008 | Kim et al. | 370/329 |
| 2010/0123769 | A1* | 5/2010 | Cho | 348/14.02 |

FOREIGN PATENT DOCUMENTS

| | | |
|---|---|---|
| JP | 06-152648 | 5/1994 |
| JP | 2001-111608 | 4/2001 |
| JP | 2005-210515 | 8/2005 |
| JP | 2008-017407 | 1/2008 |

OTHER PUBLICATIONS

Demichelis, C. & Chimento, P., IP Packet Delay Variation Metric for IP Performance Metrics (IPPM), Nov. 2002, IETF.*

* cited by examiner

*Primary Examiner* — Kambiz Zand
*Assistant Examiner* — Gregory M Elmore
(74) *Attorney, Agent, or Firm* — Staas & Halsey LLP

(57) ABSTRACT

A computer-readable, non-transitory medium storing therein a verification support program that causes a computer to execute a process that includes detecting a point in time when data of any one transaction among a series of transactions that are to be transmitted in a prescribed sequence from a device under verification, is skipped; detecting a point in time when the data is first transmitted after the detected point in time when the data is skipped; computing time elapsing from the detected point in time when the data is skipped until the detected point in time when the data is transmitted; and outputting a computation result obtained at the computing.

8 Claims, 14 Drawing Sheets

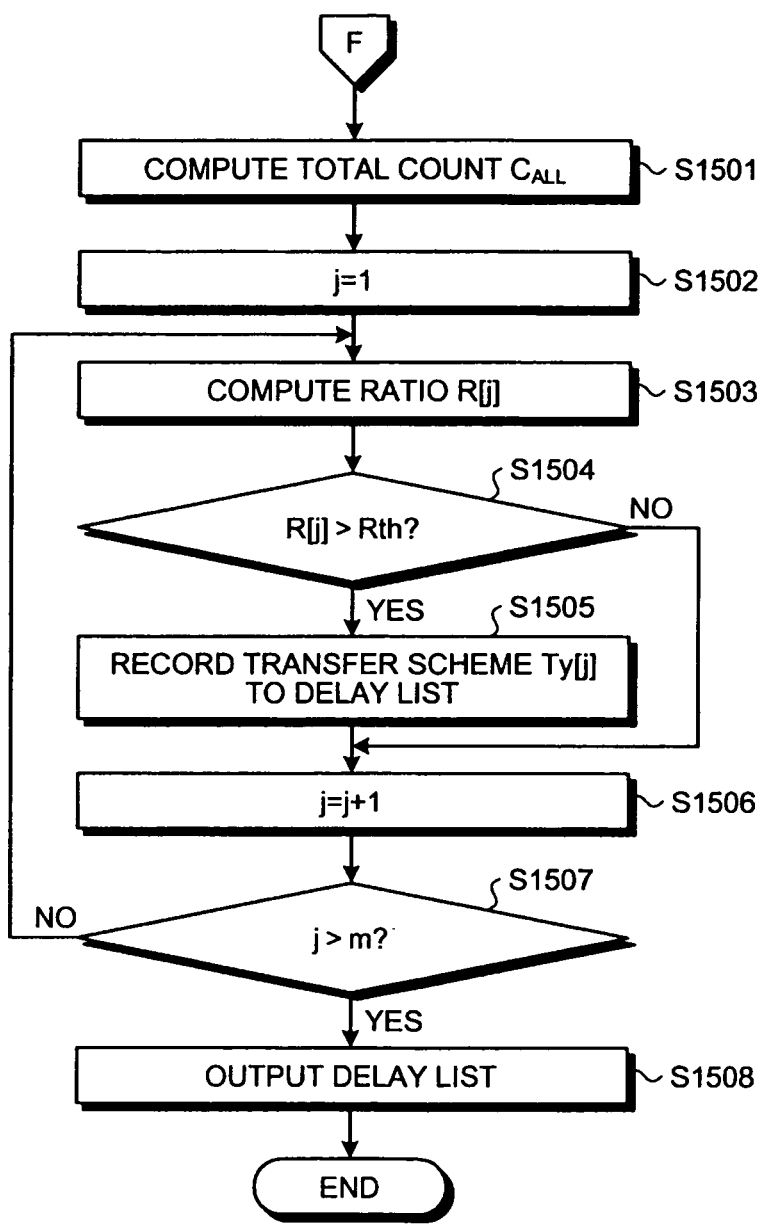

COMPUTER PRODUCT, VERIFICATION SUPPORT APPARATUS, AND VERIFICATION SUPPORT METHOD

CROSS REFERENCE TO RELATED APPLICATIONS

This application is based upon and claims the benefit of priority of the prior Japanese Patent Application No. 2010-152258, filed on Jul. 2, 2010, the entire contents of which are incorporated herein by reference.

FIELD

The embodiment discussed herein is related to device verification.

BACKGROUND

When a series of data (transaction) in an arbitrary process is transmitted from a transmission source to a transmission destination, the transaction is divided into packets and transmitted. If there are multiple transactions, respective packets of the transactions are transmitted in a prescribed sequence. For example, for transactions A and B, the prescribed sequence may be an alternating transmission of 1 packet of transaction A and 1 packet of transaction B.

Further, a conventional technology related to packet transmission evaluates network quality. For example, according to the conventional technology, the flow of communication between communication terminals is subject to measurement and extracted from packet header information. The conventional technology estimates network communication quality that includes information related to packet loss on the network, based on header information inclusive of a packet sequence number and from time series information concerning packet arrival at the receiving apparatus. For examples, refer to Japanese Laid-Open Patent Publication No. 2005-210515, Japanese Laid-Open Patent Publication No. 2001-111608, Japanese Laid-Open Patent Publication No. 2008-17407, and Japanese Laid-Open Patent Publication No. H6-152648.

Nonetheless, with the conventional technologies above, delay related to a transaction for which a packet that, according to the prescribed sequence, should have been transmitted from the transmission source device has been skipped, is difficult to determine. Consequently, the time involved and the burden on the verification engineer to identify the cause of the transaction delay with respect to the transmission source device is enormous, arising in a problem of long verification periods.

SUMMARY

According to an aspect of an embodiment, a computer-readable, non-transitory medium stores therein a verification support program that causes a computer to execute a process that includes detecting a point in time when data of any one transaction among a series of transactions that are to be transmitted in a prescribed sequence from a device under verification, is skipped; detecting a point in time when the data is first transmitted after the detected point in time when the data is skipped; computing time elapsing from the detected point in time when the data is skipped until the detected point in time when the data is transmitted; and outputting a computation result obtained at the computing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is yet another flowchart of the example of the verification support processing executed by the verification support apparatus according to the embodiment.

DESCRIPTION OF EMBODIMENTS

Preferred embodiments of the present invention will be explained with reference to the accompanying drawings.

Figure 1:
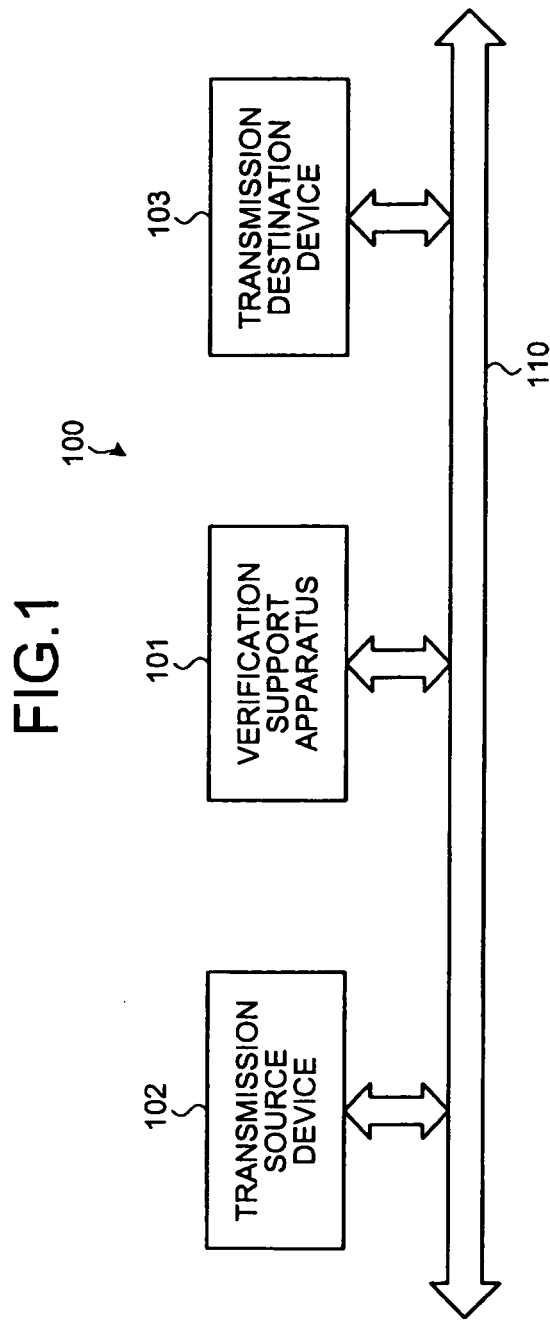
FIG. 1 is a diagram of an example of a system according to an embodiment.

FIG. 1 is a diagram of an example of a system according to an embodiment. As depicted in FIG. 1, a system 100 includes a verification support apparatus 101, a transmission source device 102, and a transmission destination device 103, respectively connected through a bus 110.

The verification support apparatus 101 is a computer that supports verification of the operation of the transmission source device 102. The transmission source device 102 is a device subject to verification and cyclically transmits a series of transactions T1 to Tn in a prescribed sequence. The transmission source device 102 is, for example, a universal serial bus (USB) host controller. The transmission destination device 103 is a device that receives the series of transactions T1 to Tn transmitted from the transmission source device 102. The transmission destination device 103 is, for example, a USB device.

The transmission source device 102 and the transmission destination device 103 may be models designed using hardware description language (HDL) and the like, or may be implemented by a field programmable gate array (FPGA) based on design data.

Herein, each of the transactions T1 to Tn are groups of data. Further, the data included in each of the transactions T1 to Tn are information that includes an identifier of the data, content, etc. In the present embodiment, explanation is given using a packet that includes a data portion and a header portion as one example of the data. Further, a USB host controller is used as the transmission source device 102 and a USB device is used as the transmission destination device 103 in the description.

Figure 2:
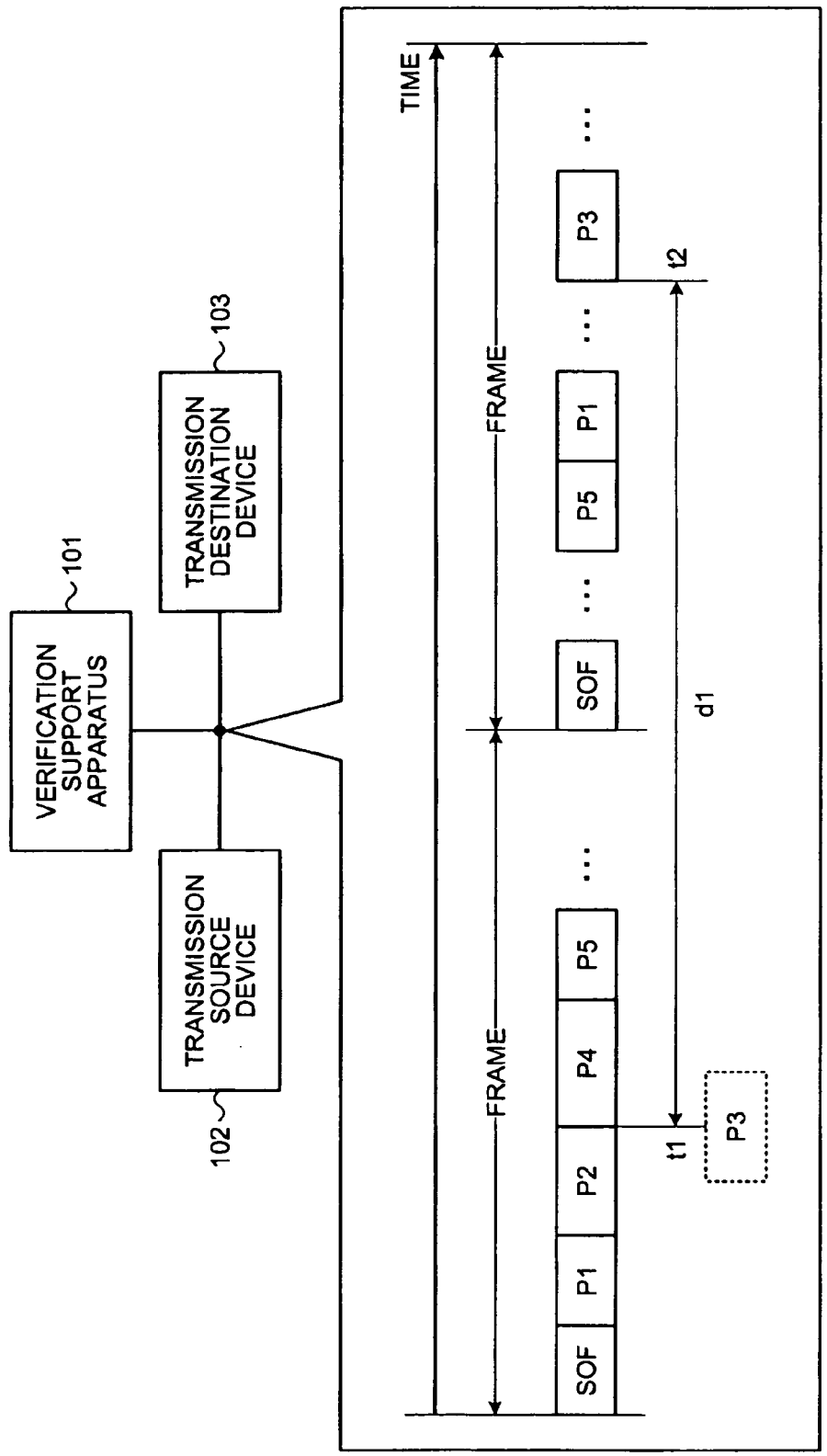
FIG. 2 is a diagram of an example of processing by a verification support apparatus according to the embodiment.
Figure 3:
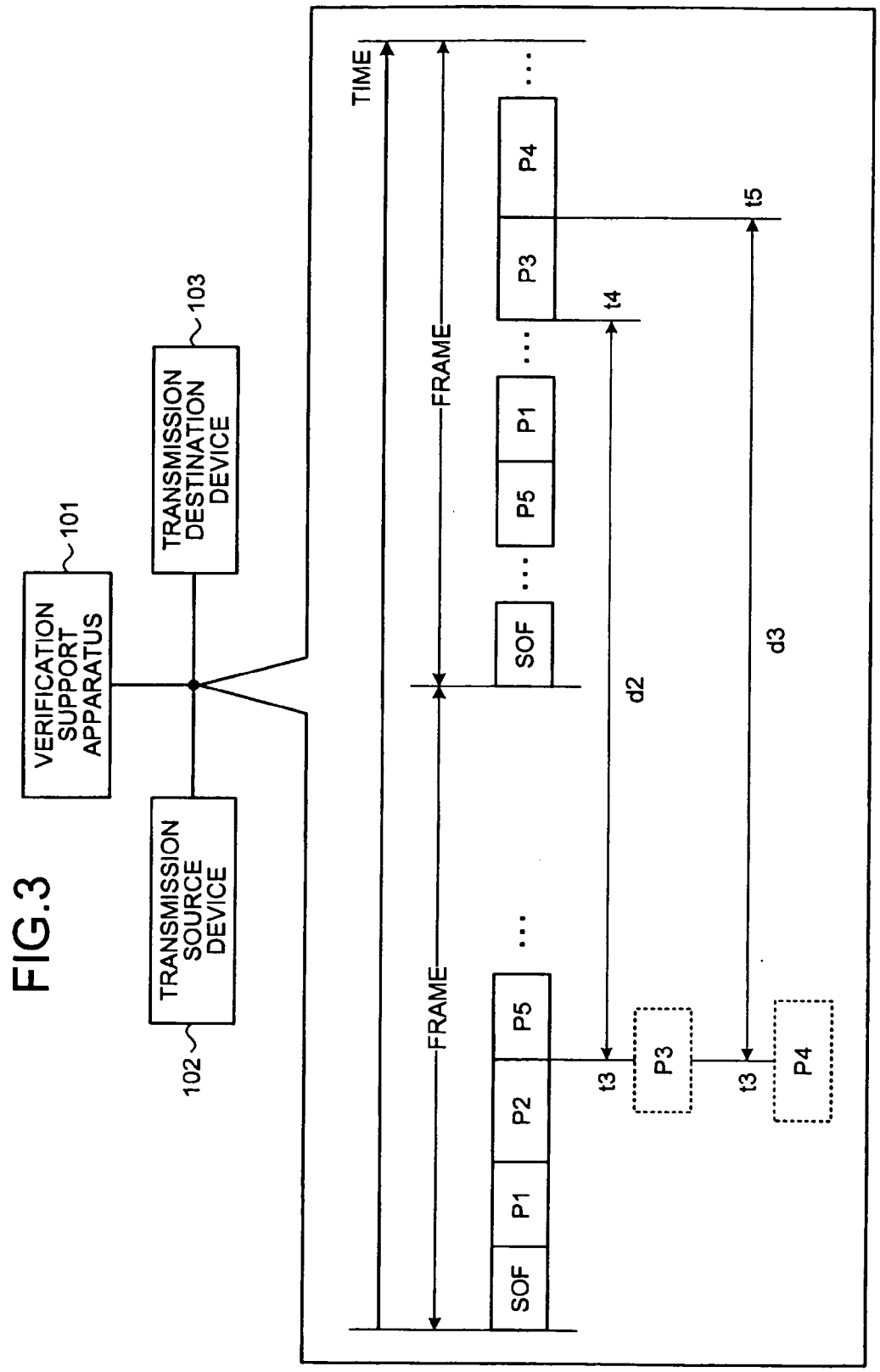
FIG. 3 is a diagram of another example of processing by the verification support apparatus according to the embodiment.

FIGS. 2 and 3 are diagrams of examples of processing by the verification support apparatus according to the embodiment. Hereinafter, among the transactions T1 to Tn, an arbitrary transaction is indicated as "transaction Ti" (i=1, 2, ..., n) and a packet included in transaction Ti is indicated as "packet Pi".

The transmission source device 102, which herein is a USB host controller, manages time in units of frames and controls the transmission of each packet Pi. The header portion of each packet Pi includes an identifier (transaction identification (ID)) indicative of the transaction Ti, a destination address, etc.

In FIGS. 2 and 3, start of frame (SOF) is a packet issued by the bus 110 to indicate the beginning of a frame. Further, a box formed by a solid line and to which Pi (herein, i=1, 2, ..., 5) is appended represents packet Pi of transaction Ti.

Herein, the transactions T1 to Tn transmitted from the transmission source device 102 to transmission destination device 103 are the transactions T1 to T5 and the prescribed sequence is the order "T1→T2→ ... →T5", i.e., the transaction IDs in ascending order. Firstly, the example depicted in FIG. 2 will be explained.

In FIG. 2, after the SOF is transmitted from the transmission source device 102 to the transmission destination device 103, packets P1 and P2 are transmitted in the prescribed sequence. Packet P4 is transmitted when, according to the prescribed sequence, packet P3 should be transmitted from the transmission source device 102 to the transmission destination device 103.

In other words, for whatever reason, packet P3, which should be transmitted after packet P2, is skipped (in FIG. 2, a dotted-line box) and instead packet P4 is transmitted. Factors causing packet P3 to be skipped include, for example, those related to faulty operation of the transmission source device 102, those based on communication protocol, design specifications of the transmission source device 102, etc.

If packet P3 is skipped, there is a time delay until packet P3 is transmitted. The delay time for packet P3 is the time that elapses until the transmission of transaction T3 from the transmission source device 102 is completed. In the embodiment, each time a packet Pi that, according to the prescribed sequence, should be transmitted is skipped, the time that elapses until the first transmission of the packet Pi after the skipping is sought and presented.

In the example depicted in FIG. 2, the verification support apparatus 101 first detects time t1, the time when packet P3 of the transaction T3 is skipped. For example, the verification support apparatus 101 detects the time of transmission of packet P4 in place of that of packet P3 (which has been skipped) as the time t1 when packet P3 is skipped.

Subsequently, the verification support apparatus 101 detects time t2, the time when packet P3 is transmitted for the first time after being skipped at time t1. For example, the verification support apparatus 101 detects, as the time t2, the time of the first transmission of packet P3 after the time t1 when packet P3 is skipped.

The verification support apparatus 101 computes the time (time d1) that elapses from the time t1 when packet P3 is skipped until the time t2 when packet P3 is transmitted. The time d1 is the delay time that occurs for packet P3, consequent to the skipping of packet P3. The verification support apparatus 101 outputs the computed time d1 as the delay time for packet P3. Next, the example depicted in FIG. 3 will be described.

In FIG. 3, after the SOF is transmitted from the transmission source device 102 to the transmission destination device 103, packets P1 and P2 are transmitted in the prescribed sequence. Packet P5 is transmitted when, according to the prescribed sequence, packet P3 should be transmitted from the transmission source device 102. In other words, packet P3, which should be transmitted after packet P2, is skipped and in succession, packet P4 is also skipped (in FIG. 3, the dotted-line box).

In this case, the verification support apparatus 101 first detects time t3, the time when packet P3 of the transaction T3 is skipped. For example, the verification support apparatus 101 detects the time of transmission of packet P5 in place of that of packet P3 which is skipped, as the time t3 when packet P3 is skipped.

Subsequently, the verification support apparatus 101 detects time t4, the time when packet P3 is transmitted for the first time after being skipped.

The verification support apparatus 101 computes the time (time d2) that elapses from the time t3 when packet P3 is skipped until the time t4 when packet P3 is transmitted. The time d2 is the delay time that occurs for packet P3, consequent to the skipping of packet P3. The verification support apparatus 101 outputs the computed time d2 as a wait-time for packet P3.

The verification support apparatus 101 detects time t3, the time when packet P4 of the transaction T4 is skipped. This time t3 is equivalent to the time when packet P3 of the transaction T3 is skipped. In other words, if packets P3 and P4 are successively skipped, the time at which the packets P3 and P4 are skipped is the same for both packets P3 and P4.

Subsequently, the verification support apparatus 101 detects time t5, the time when packet P4 is transmitted for the first time after being skipped at the time t3. For example, the verification support apparatus 101 detects, as the time t5, the time of the first transmission of packet P4 after the time t3 when packet P4 is skipped.

The verification support apparatus 101 computes the time (time d3) that elapses from the time t3 when the packet P4 is skipped until the time t5 when packet P4 is transmitted, and outputs the computed time d3 as the delay time for packet P4.

According to the verification support apparatus 101 described, if a packet Pi of transaction Ti is to be transmitted according to the prescribed sequence, but instead is skipped, the time that elapses until the packet Pi is transmitted for the first time after being skipped is sought and provided. As a result, the amount of time that the commencement of transmission of the packet Pi is delayed consequent to the transmission source device 102 failing to transmit the packet Pi in the prescribed sequence can be identified.

Further, by summing delay times for packets Pi that are skipped among the packets Pi included in the transaction Ti, the amount of delay in the completion of the transmission for the transaction Ti can be identified. As a result, for example, the verification engineer is able to verify whether the delay time for transaction Ti is value at most that permissible by the designer or customer.

Figure 4:
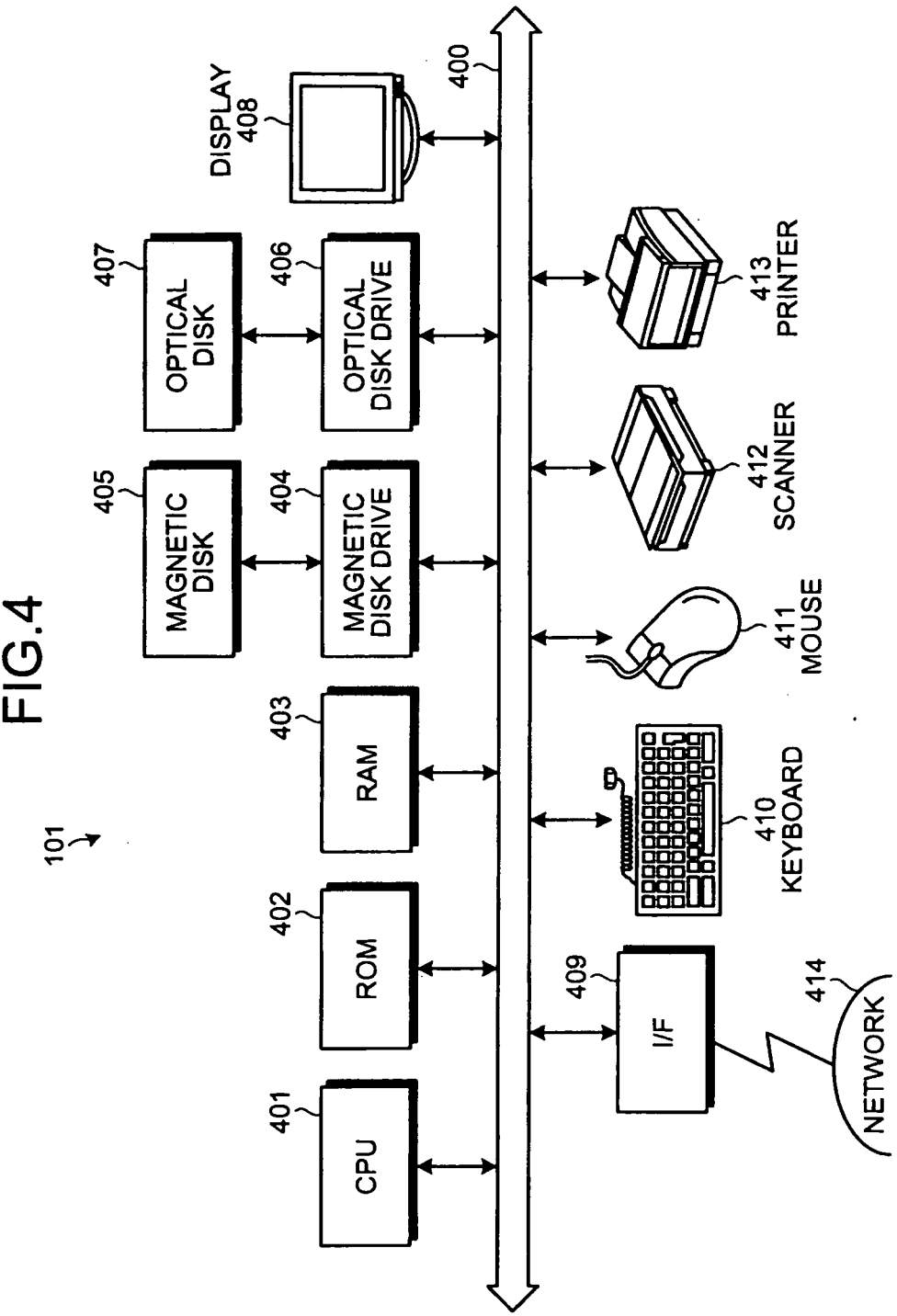
FIG. 4 is a block diagram of one example of a hardware configuration of the verification support apparatus according to the embodiment.

FIG. 4 is a block diagram of one example of a hardware configuration of the verification support apparatus according to the embodiment. As depicted in FIG. 4, the verification support apparatus 101 includes a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413, respectively connected by a bus 400.

The CPU 401 governs overall control of the verification support apparatus 101. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under control of the optical disk drive 406, the data being read by a computer.

The display 408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 408.

The I/F 409 is connected to a network 414 such as a local area network (LAN), a wide area network (WAN), and the Internet through a communication line and is connected to other apparatuses through the network 414. The I/F 409 administers an internal interface with the network 414 and controls the input/output of data from/to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows. A track ball or a joy stick may be adopted provided each respectively has a function similar to a pointing device.

The scanner 412 optically reads an image and takes in the image data into the verification support apparatus 101. The scanner 412 may have an optical character reader (OCR) function as well. The printer 413 prints image data and text data. The printer 413 may be, for example, a laser printer or an ink jet printer.

Figure 5:
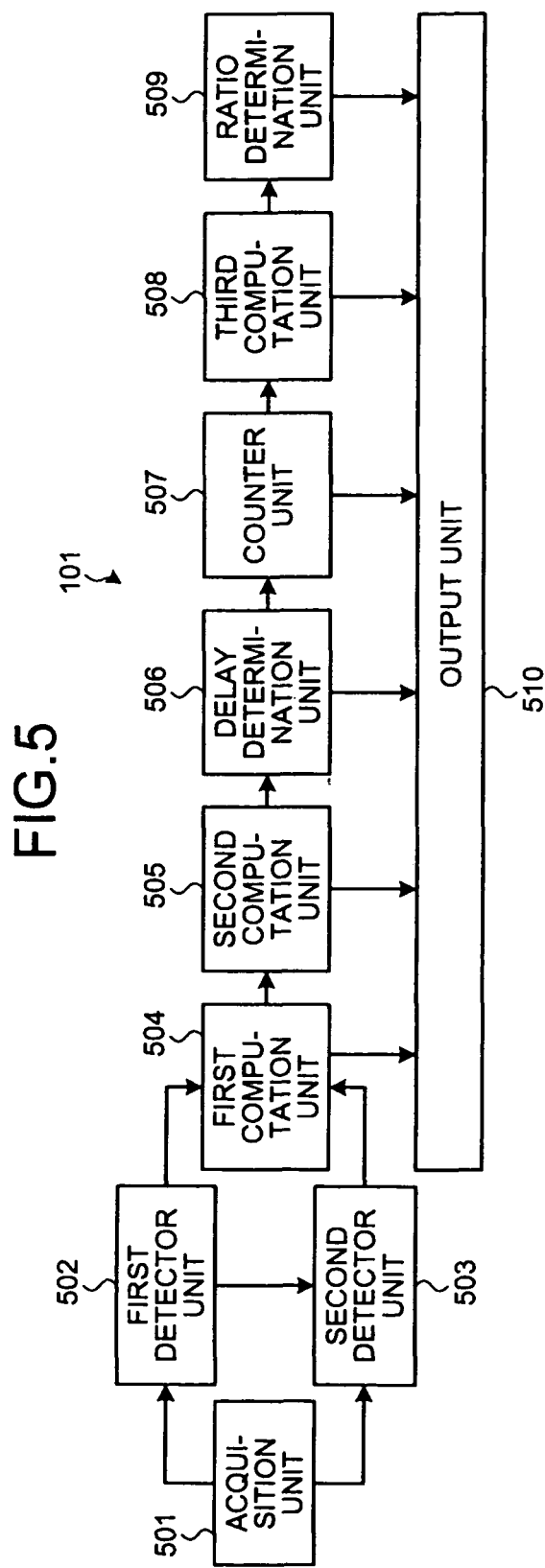
FIG. 5 is a diagram of a functional configuration of the verification support apparatus according to the embodiment.

FIG. 5 is a diagram of a functional configuration of the verification support apparatus according to the embodiment. As depicted in FIG. 5, the verification support apparatus 101 includes an acquisition unit 501, a first detector unit 502, a second detector unit 503, a first computation unit 504, a second computation unit 505, a delay determination unit 506, a counter unit 507, a third computation unit 508, a ratio determination unit 509, and an output unit 510.

Functions of the functional units (the acquisition unit 501 to the output unit 510) are implemented by, for example, the CPU 401 executing a program stored in a storage device such as the ROM 402, the RAM 403, the magnetic disk 405, and the optical disk 407 depicted in FIG. 4, or by the I/F 409. Unless otherwise specified, processing results obtained by the functional units (the acquisition unit 501 to the output unit 510) are stored to a storage device such as the RAM 403, the magnetic disk 405, and the optical disk 407.

The acquisition unit 501 acquires information concerning a packet Pi transmitted from the transmission source device 102 to the transmission destination device 103. Herein, information concerning the packet Pi (hereinafter, packet information) is, for example, information included in the header portion of the packet Pi, such as the time of transmission of the packet Pi, the transaction ID of the transaction Ti that includes the packet Pi, a transfer scheme, etc.

The transfer scheme for the transaction Ti is, for example, bulk transfer, interrupt transfer, control transfer, isochronous transfer (data flow transfer), etc. In the description hereinafter, multiple transfer schemes are indicated as "transfer schemes Ty[1] to Ty[m]" and a transfer scheme for a transaction Ti is indicated as "transfer scheme Ty[j]". Further, the time of transmission of a packet Pi may be the actual time of transmission, a time in the context of the simulation, etc.

For example, the acquisition unit 501 may acquire packet information by receiving a packet Pi from the transmission source device 102. Further, if the transmission source device 102 is simulated, the acquisition unit 501 may acquire simulation results as packet information. Herein, an example of simulation results will be described.

Figure 6:
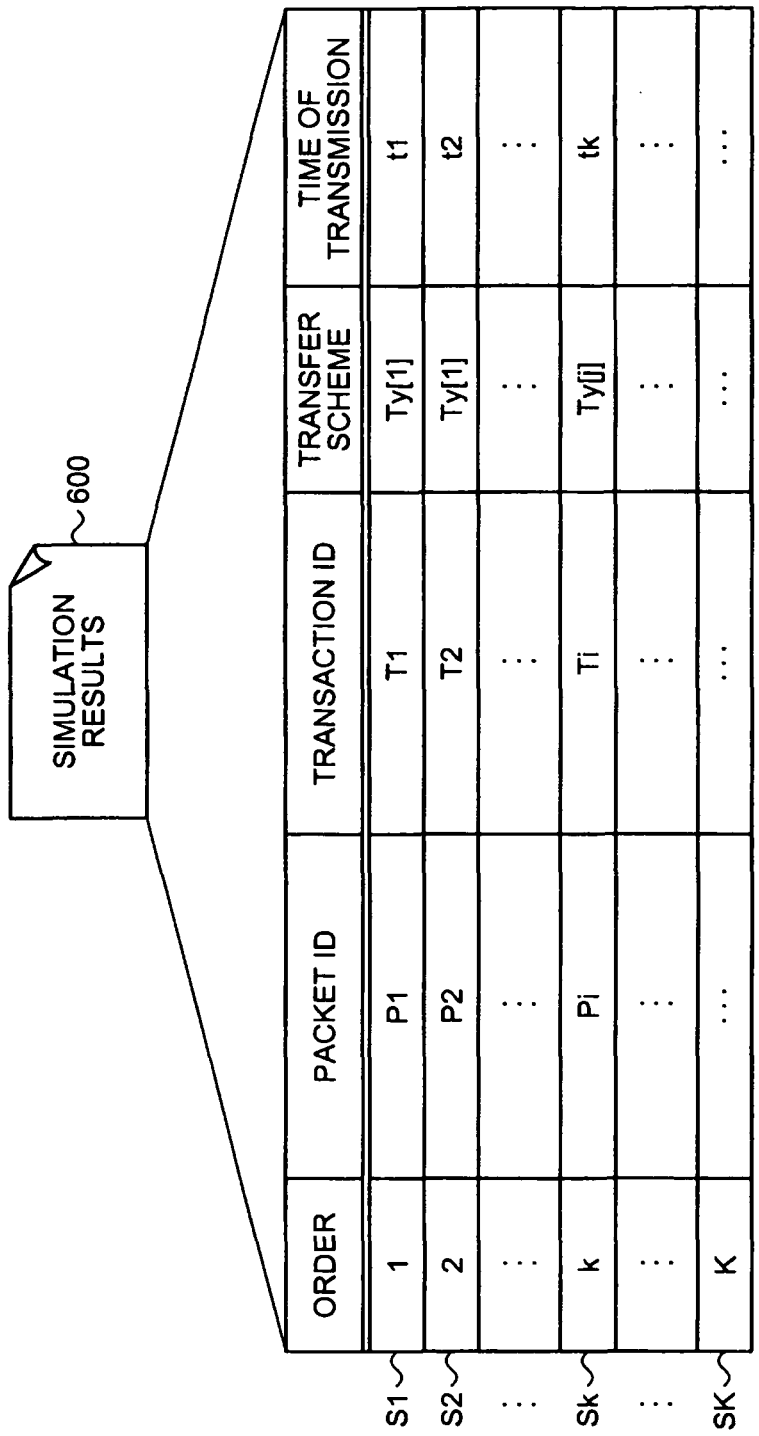
FIG. 6 is a diagram of an example of simulation results.

FIG. 6 is a diagram of an example of simulation results. In FIG. 6, simulation results 600 is a collection of packet information Sk for packets Pi transmitted from the transmission source device 102 to the transmission destination device 103 from the beginning to the end of a simulation of the operation of the transmission source device 102.

Herein, order is the transmission sequence in which a packet Pi is transmitted from the transmission source device 102. Packet ID is the identifier for a packet Pi. Transaction ID is the identifier for a transaction Ti. Transfer scheme is the transfer scheme Ty[j] for a transaction Ti. The time of transmission is the time of transmission of the packet Pi.

The acquisition unit 501 may collectively acquire the simulation results from the beginning of the simulation to the end of the simulation. Further, the acquisition unit 501 may acquire, in real-time, the packet information Sk for the packet Pi transmitted from the transmission source device 102 to the transmission destination device 103.

The reference of the description returns to FIG. 5. The first detector unit 502 detects the time (time tx) when a packet Pi of a transaction Ti, among the transactions T1 to Tn that are to be transmitted cyclically in the prescribed sequence from the transmission source device 102, is skipped. Herein, the prescribed sequence in which the transactions T1 to Tn are to be transmitted is, for example, arbitrarily set by the designer of the transmission source device 102.

For example, the transmission sequence may be prescribed by designating the transaction that is to be transmitted first, while for other transactions, the transaction that precedes a given transaction is designated. Further, the transmission sequence may be prescribed by designating the order of each transaction. In the description hereinafter, a sequence (T1→T2→ . . . →Tn), i.e., ascending order of the transaction IDs, is used as the prescribed sequence in which the transactions T1 to Tn are transmitted.

For example, the first detector unit 502, based on simulation results for the transmission source device 102, identifies a packet P[k] that has been transmitted out of sequence with respect to the prescribed sequence. Subsequently, the first detector unit 502 identifies the packet (packet P[1]) that was transmitted from the transmission source, immediately before the packet P[k].

Next, the first detector unit 502 identifies packets P[l+1], P[l+2], . . . , P[k−1] as packets Pi that, according to the prescribed sequence, have been skipped between the transmission of packet P[1] and packet P[k]. Further, the first detector unit 502 detects the time of the transmission of packet P[k] as the time that each of the packets Pi was skipped, time tx.

In the example depicted in FIG. 2, first, the first detector unit 502 identifies packet P4 as a packet that has been transmitted out of sequence with respect to the prescribed sequence. Subsequently, the first detector unit 502 identifies packet P2 as the packet that was transmitted, from the transmission source device 102, immediately before packet P4. Next, the first detector unit 502 detects packet P3, which according to the prescribed sequence, is between packet P2 and packet P4, as a packet that has been skipped. Then, the first detector unit 502 detects the time of the transmission of packet P4 as the time tx that packet P3 was skipped.

In the example depicted in FIG. 3, first, the first detector unit 502 identifies packet P5 as a packet that has been transmitted out of sequence with respect to the prescribed sequence. Subsequently, the first detector unit 502 identifies packet P2 as the packet that was transmitted, from the transmission source device 102, immediately before packet P5. Next, the first detector unit 502 detects packets P3 and P4, which according to the prescribed sequence, are between packet P2 and packet P5, as packets that have been skipped. Then, the first detector unit 502 detects the time of the transmission of packet P5 as the time tx that packets P3 and P4 were skipped.

An example of processing by the first detector 502 to identify a packet P[k] that has been transmitted, from the transmission source 102, out of sequence with respect to the prescribed order and a packet Pi that has been skipped will be described with reference to FIGS. 10 to 12.

The second detector unit 503 detects the time ty when packet Pi is transmitted for the first time after being skipped at the time tx. For example, based on the simulation results for the transmission source device 102, the second detector unit 503 identifies the first packet Pi that is transmitted after the time of transmission of packet P[k], which was transmitted out of sequence with respect to the prescribed sequence. Then, the second detector unit 503 detects the time of transmission of the identified packet Pi as the time ty.

The first computation unit 504 computes the time d[i] that elapses from the time tx when packet Pi is skipped until the time ty when packet Pi is transmitted. Herein, the time d[i] is the delay time (i.e., the excess time consumed for commencement of the transmission of packet Pi) consequent to the transmission source device 102 failing to transmit packet Pi in the prescribed sequence.

For example, the first computation unit 504 computes, as the time d[i], the difference between the time of transmission of packet P[k], which was transmitted out of sequence with respect to the prescribed sequence, and the time of the first transmission of packet Pi after the time of transmission of packet P[k]. For example, the time d[i] can be computed using equation (1) below.

$$d[i]=ty-tx \quad (1)$$

The second computation unit 505 computes a delay time D[i] for each transaction Ti by summing, for each transaction Ti, the time d[i] computed for packets Pi. Herein, the delay time D[i] is the delay time (i.e., the excess time consumed for completion of the transmission of the transaction Ti), which is equivalent to the sum of the respective times d[i] of packets Pi that are skipped among packets Pi included in the transaction Ti.

For example, the second computation unit 505 computes the delay time D[i] related to the transaction Ti, by using equation (2) below, upon computing the time d[i] for a packet Pi, where D[i] is the delay time corresponding to the transaction Ti and d[i] is the delay time that elapses (i.e., the excess time consumed) until commencement of the transmission for packet Pi, which has been skipped.

$$D[i]=D[i]+d[i] \quad (2)$$

Figure 7:
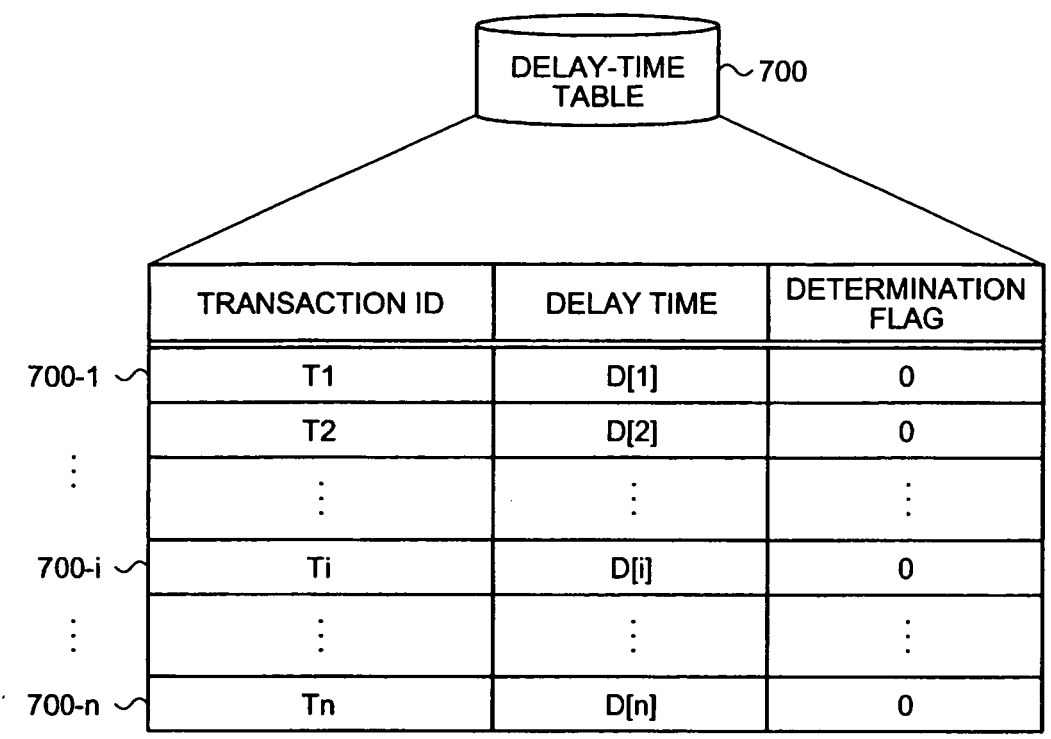
FIG. 7 is a diagram of one example the contents of a delay-time table.

The computed delay time D[i] related to the transaction Ti, is stored to a delay-time table 700 depicted in FIG. 7, for example. Herein, contents of the delay-time table 700 will be described. The delay-time table 700, for example, is implemented by a storage device, such as the RAM 403, the magnetic disk 405, and the optical disk 407.

FIG. 7 is a diagram of one example the contents of a delay-time table. In FIG. 7, the delay-time table 700 has fields including transaction ID, delay time, and determination flag. Delay-time information 700-1 to 700-$n$ related to the transactions T1 to Tn, are stored as records through a setting of information in each of the fields.

Herein, a transaction ID is the identifier of a transaction Ti. A delay time is the delay time D[i] corresponding to the transaction Ti. A determination flag is a flag that is changed according to determination results obtained by the delay determination unit 506, described hereinafter. A determination flag has a value of "0" in the initial state. The determination flag is described in detail hereinafter.

The contents of the delay-time table 700 are updated upon computation of the delay time D[i] related to the transaction Ti, the delay time D[i] being computed by the second computation unit 505. For example, upon computation of the delay time D[1] corresponding to the transaction T1, the delay time included in the delay-time information 700-1 in the delay-time table 700 is updated.

The reference of the description returns to FIG. 5. The delay determination unit 506 determines whether the computed delay time D[i] corresponding to the transaction Ti is greater than a given threshold Dth. For example, the delay determination unit 506 refers to the delay-time table 700 depicted in FIG. 7 and determines whether the delay time D[i] corresponding to the transaction Ti is greater than the threshold Dth.

Herein, the threshold Dth is set to be equal to or less than a value allowed (by the designer or customer) as the delay time D[i] related to the transaction Ti. For example, if it is desirable to control the delay time D[i] to be $\alpha$ or less, the threshold Dth is set to be $\alpha$. The threshold Dth is, for example, preliminarily set and stored in a storage device such as the ROM 402, the RAM 403, the magnetic disk 405, and the optical disk 407 depicted in FIG. 4.

If the delay time D[i] related to the transaction Ti is greater than the threshold Dth, the determination flag of the delay-time information 700-$i$ in the delay-time table 700 is changed from "0" to "1". By referring to the determination flags in the delay-time table 700, each transaction Ti that has a delay time D[i] greater than the threshold Dth can be identified.

The counter unit 507, for each transfer scheme of transferring transaction Ti, counts the number of delay times D[i] (respectively corresponding to transactions Ti) that have been determined to be greater than the threshold Dth (count C[j]). For example, the counter unit 507 refers to the packet information Sk concerning such a packet Pi that has been skipped and identifies the transfer scheme Ty[j] of the transaction Ti. Then, the counter unit 507, by incrementing the count C[j] for the transfer scheme Ty[j] in a count table 800 depicted in FIG. 8, counts the number of times the threshold is exceeded for the transfer scheme Ty[j].

The third computation unit 508 computes the ratio R[j] of the count C[j] for the transfer scheme Ty[j] with respect to a total count $C_{ALL}$. Herein, the total count $C_{ALL}$ is a sum of the counts C[1] to C[m] for transfer schemes Ty[1] to Ty[m]. For example, first, the third computation unit 508 uses equation (3) below to sum the counts C[1] to C[m] to compute the total count $C_{ALL}$. The counts C[1] to C[m] can be identified, for example, by referring to the count table 800 depicted in FIG. 8.

$$C_{ALL} = \sum_{j=1}^{m} C[j] \qquad (3)$$

Subsequently, the third computation unit 508, using equation (4) below, computes the ratio R[j] of the count C[j] for each transfer scheme, with respect to the total count $C_{ALL}$, where R[j] is the ratio of the count C[j] for the transfer scheme Ty[j] with respect to the total count $C_{ALL}$ (%).

$$R[j]=100 \times C[j]/C_{ALL} \qquad (4)$$

Figure 8:
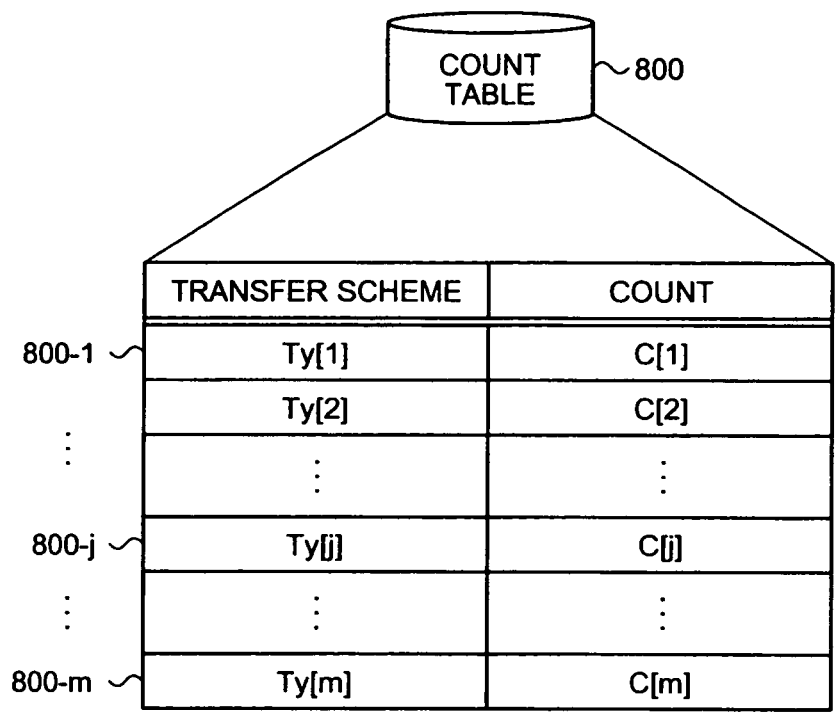
FIG. 8 is a diagram of one example of the contents of a count table.

The ratio R[j] computed for the transfer scheme Ty[j] is, for example, stored to the count table 800 depicted in FIG. 8. Herein, the contents of the count table 800 will be described. The count table 800 is implemented by, for example, a storage device such as the RAM 403, the magnetic disk 405, and the optical disk 407.

FIG. 8 is a diagram of one example of the contents of the count table. In FIG. 8, the count table 800 has fields including transfer scheme and count. By a setting of information in each of the fields, count information 800-1 to 800-m for each transfer scheme Ty[1] to Ty[m] is stored as records.

Herein, a transfer scheme is the transfer scheme Ty[j] for a transaction Ti. A count is the count C[j] indicative of the number of delay times D[i] (respectively corresponding to transactions Ti) that have been determined to be greater than the threshold Dth. The initial value for each count C[j] is "0". Ratio is the ratio R[j] of the count C[j] with respect to the total count $C_{ALL}$.

The reference of the description returns to FIG. 5. The ratio determination unit 509 determines whether the computed ratio R[j] of the count C[j] for the transfer scheme Ty[j] is greater than a given threshold Rth. The threshold Rth is set, for example, as numeric values such as 30, 40, and 50. The threshold Rth is, for example, preliminarily set and stored in a storage device such as the ROM 402, the RAM 403, the magnetic disk 405 and the optical disk 407 depicted in FIG. 4.

Figure 9:
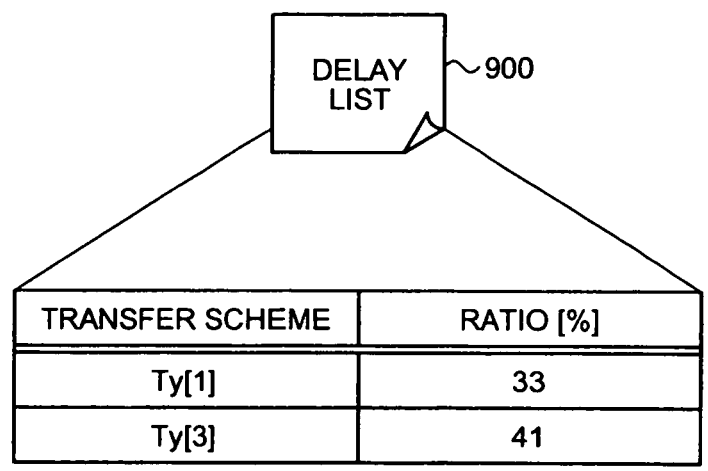
FIG. 9 is a diagram of an example of a delay list.

Further, the transfer scheme Ty[j] for which the ratio R[j] is determined to be greater than the threshold Rth is, for example, recorded to a delay list 900 depicted in FIG. 9. Herein, an example of the delay list 900 will be described, where the threshold Rth is 30.

FIG. 9 is a diagram of an example of a delay list. In FIG. 9, the delay list 900 is information that indicates the transfer schemes Ty[j] for which the ratio R[j] has been determined be greater than the threshold Rth. For example, in the delay list 900, transfer schemes Ty[1] and Ty[3] for which the ratio R[j] exceeds the threshold are displayed. The ratio R[1] of the transfer scheme Ty[1] is 33% and the ratio R[1] of the transfer scheme Ty[1] is 41%.

The reference of the description returns to FIG. 5. The output unit 510 outputs results of the determination by the ratio determination unit 509. For example, the output unit 510 may output the delay list 900 depicted in FIG. 9. Thus, among the transfer schemes Ty[1] to Ty[m], transfer schemes Ty[j] for which the count C[j] is relatively high can be identified, the count C[j] being indicative of the number of transactions Ti for which the delay time D[i] is greater than the threshold Dth.

Forms of output by the output unit 510 include, for example, display on the display 408, print out at the printer 413, and transmission to an external apparatus via the I/F 409 as well as storage to a storage area such as the RAM 403, the magnetic disk 405, and the optical disk 407.

The output unit 510 may output the time d[i] for the packet Pi computed by the first computation unit 504. Thus, the delay time (i.e., the excess time consumed for commencement of the transmission of the packet Pi) consequent to the transmission source device 102 failing to transmit the packet Pi in the prescribed sequence can be identified.

The output unit 510 may output the delay time D[i] corresponding to the transaction Ti and computed by the second computation unit 505. Thus, the delay time (i.e., the excess time consumed for completion of the transmission for the transaction Ti) equivalent to the sum of the respective times d[i] of packets Pi that are skipped among packets Pi included in the transaction Ti, can be identified.

The output unit 510 may output the results of the determination by the delay determination unit 506. Thus, transactions Ti for which the delay time D[i] is greater than a value (threshold Dth) allowed by the designer or customer can be identified.

The output unit 510 may output the counts C[j] for each of the transfer schemes Ty[j], counted by the counter unit 507. Thus, the counts C[j] indicative of the number of transactions Ti having a delay time D[i] that is greater than the threshold Dth can be identified for each transfer scheme Ty[j].

One example of the processing executed by the first detector unit 502 to identify a packet P[k] that has been transmitted from the transmission source device 102 out of sequence with respect to the prescribed sequence and a packet Pi that has been skipped.

With reference to a list 1000 having a configuration depicted in FIG. 10, identification of a packet P[k] that has been transmitted from the transmission source device 102 out of sequence with respect to the prescribed sequence and a packet Pi that has been skipped will be described, where the transactions T1 to Tn transmitted from the transmission source device 102 to the transmission destination device 103 are the transactions T1 to T3.

Figure 10:
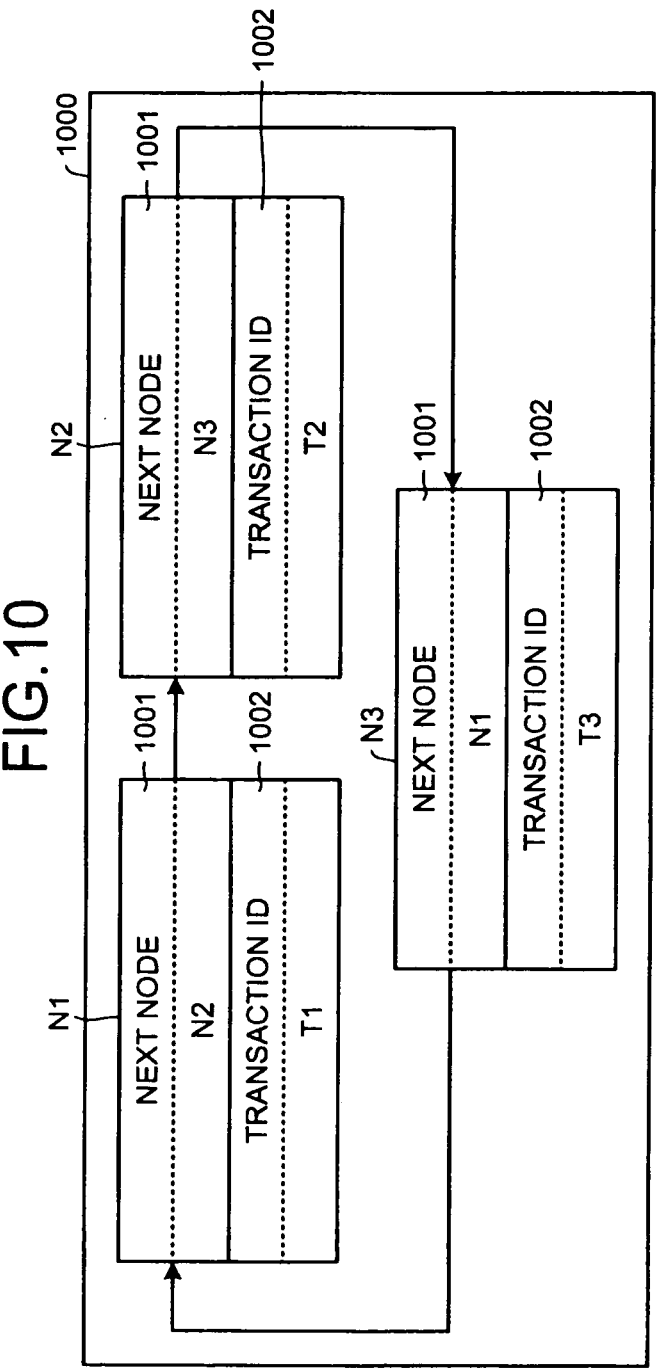
FIG. 10 is a diagram of an example of a list.

FIG. 10 is a diagram of an example of a list. In FIG. 10, the list 1000 is information indicative of the prescribed sequence for packets P1 to P3 of the transactions T1 to T3. The list 1000 includes nodes N1 to N3 representative of the transactions T1 to T3, respectively. Each node has a field 1001 and a field 1002.

Field 1001 stores the node ID of a subsequent node. A subsequent node is a node representing the transaction that is to be transmitted subsequent to a given node also representing a transaction. A Node ID is the identifier of a node. In this example, field 1001 of node N1 stores the node ID of node N2 "N2". Field 1001 of node N2 stores the node ID of node N3 "N3". Field 1001 of node N3 stores the node ID of node N1 "N1". In other words, the list 1000 indicates that the transactions T1 to T3 are transmitted in the order "T1→T2→T3".

Field 1002 stores the transaction ID of the transaction corresponding to a given node. In this example, field 1002 of node N1 stores the transaction ID "T1" of the transaction T1. Field 1002 of node N2 stores the transaction ID "T2" of the transaction T2. Field 1002 of node N3 stores the transaction ID "T3" of the transaction T3.

The first detector unit 502 identifies the subsequent node stored in field 1001 of the current node, upon selection of packet Pi from among packets transmitted from the transmission source device 102 to the transmission destination device 103. Packet Pi is selected in the transmission sequence transmitted from the transmission source device 102 to the transmission destination device 103.

The current node is a reference node within the list 1000 and in the initial state, is set as the tail node, node N3. The first detector unit 502 determines whether the transaction ID stored in field 1002 of the subsequent node and the transaction ID of the selected packet Pi coincide.

If the transaction IDs coincide, the first detector unit 502 sets the subsequent node as the current node in the list 1000. On the other hand, if the transaction IDs do not coincide, the first detector unit 502 detects the acquired packet Pi as a packet P[k] that has been transmitted out of sequence with respect to the prescribed sequence.

Figure 11:
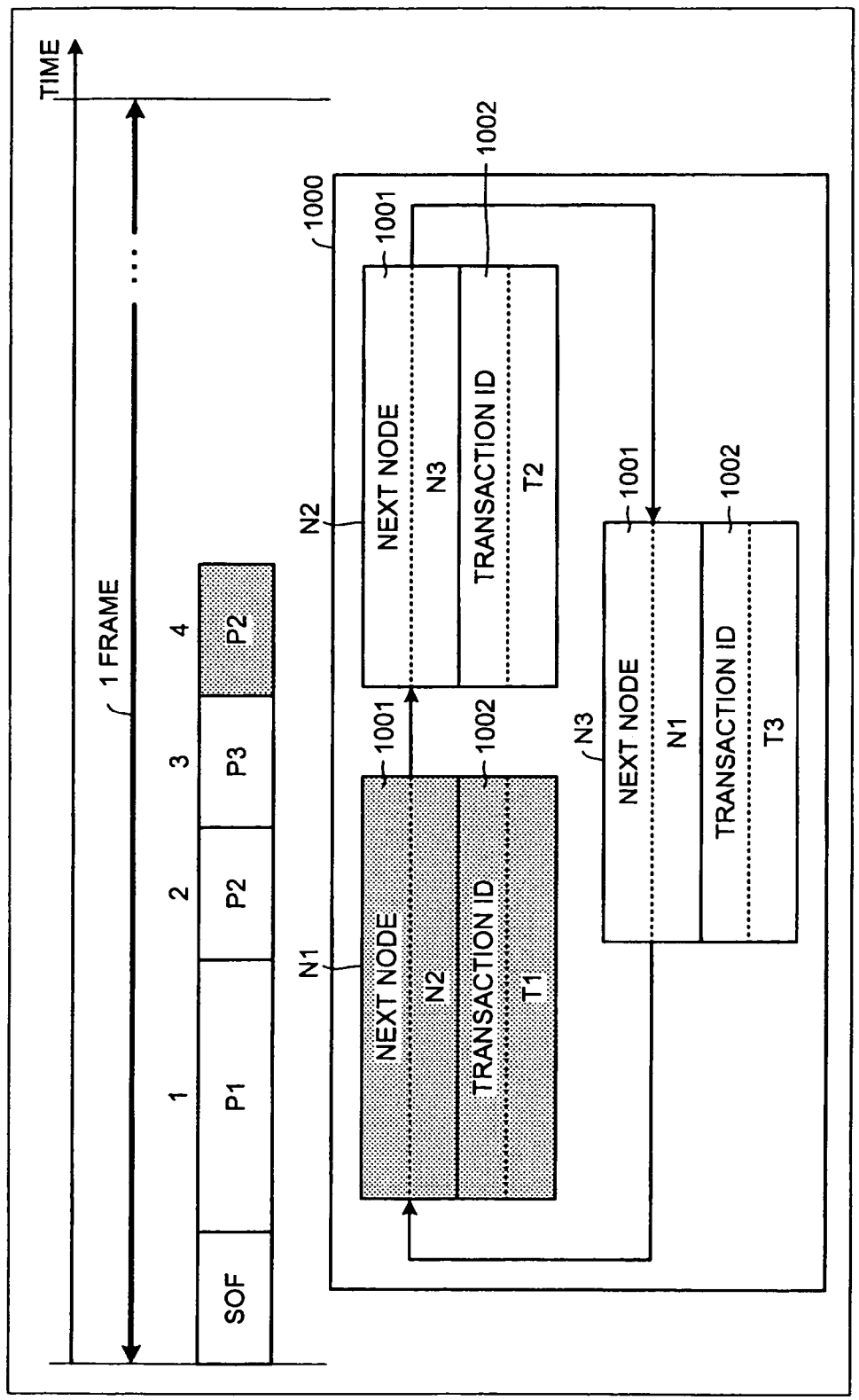
FIG. 11 is a diagram of an example a packet being transmitted out of sequence.

FIG. 11 is a diagram of an example a packet being transmitted out of sequence. In FIG. 11, numerals appended to solid-line boxes indicate the order in which each packet is transmitted within 1 frame. In FIG. 11, after packets P1 to P3 have been transmitted in the prescribed sequence, packet P2 is transmitted fourth. The current node set in the list 1000 is node N3.

In this case, the first detector unit 502 selects packet P2 and identifies the subsequent node N1 which is stored in field 1001 of the current node N3. The first detector unit 502 determines whether the transaction ID "T1" stored in field 1002 of the subsequent node N1 and the transaction ID "T2" of the selected packet P2 coincide.

Since the transaction IDs do not coincide, the first detector unit 502 detects the packet P2 as a packet P[k] that has been transmitted out of sequence with respect to the prescribed sequence. Then the first detector unit 502 identifies the packet P1 of the transaction T1, which is identified by the transaction ID stored in field 1002 of the subsequent node N1, as a packet Pi that has been skipped.

Next, the first detector unit 502 sets the current node in the list 1000 as node N1, which is the subsequent node of the current node N3. The first detector unit 502 sets the subsequent node N2 stored in field 1001 of the current node N1 and determines whether the transaction ID "T2" stored in field 1002 of the subsequent node N2 and the transaction ID "T2" of the selected packet P2 coincide.

Since the transaction IDs coincide, the first detector unit 502 sets the subsequent node N2 of the current node N1 as the current node in the list 1000. Here, if the transaction IDs do not coincide, the processing is repeated until the transaction IDs coincide. Thus, if multiple packets are skipped in succession, the skipped packets Pi can be identified.

According to the processing described, a packet P[k] that has been transmitted out of sequence with respect to the prescribed sequence and a packet Pi that has been skipped can be identified. Next, an example where the packet Pi transmitted from the transmission source device 102 is the last packet of a transaction Ti will be described.

As transmission of the transactions T1 to Tn may not be completed within the same cycle, nodes Ni representing transactions Ti for which all of the packets Pi have been transmitted are deleted from the list. An example will be described where all of the packets P3 have been transmitted and consequently, node N3 representing the transaction T3 is deleted.

Figure 12:
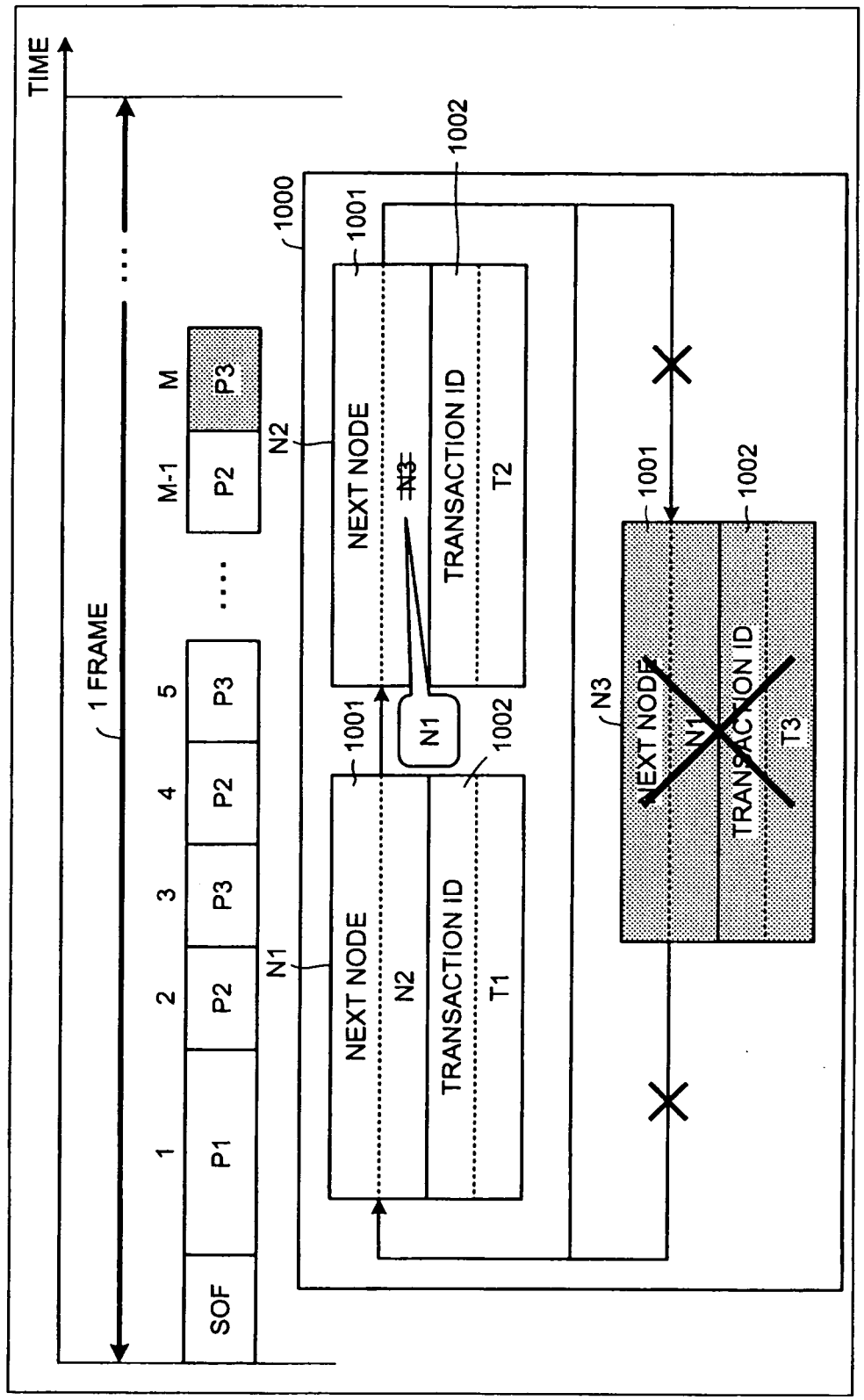
FIG. 12 is a diagram of an example of node deletion in the list.

FIG. 12 is a diagram of an example of node deletion in the list. In this example, in 1 frame, a packet P3 transmitted m-th is the last packet of the transaction T3. Each packet Pi includes a flag that indicates whether the packet is the last packet of the transaction Ti. Furthermore, the current node here is node N2.

After the first detector unit 502 determines whether packet P3 transmitted m-th has been transmitted in the prescribed sequence, the first detector unit 502 further determines whether the packet P3 is the last packet of the transaction T3. For example, the first detector unit 502 refers to the flag of the packet P3 to determine the packet P3 to be last packet of the transaction T3.

The first detector unit 502 sets, in field 1001 of the current node N2, the node ID "N1" stored in field 1001 of the subsequent node N3 and deletes node N3. In this case, the current node is not changed. Thus, with the completion of the transmission of all of the packets Pi included in the transaction Ti, the configuration of a list (e.g., the list 1000) can be corrected.

Next, verification support processing executed by the verification support apparatus 101 will be described. An example will be described in which the verification support apparatus 101 uses the simulation results 600 depicted in FIG. 6 to execute the verification support processing.

Figure 13:
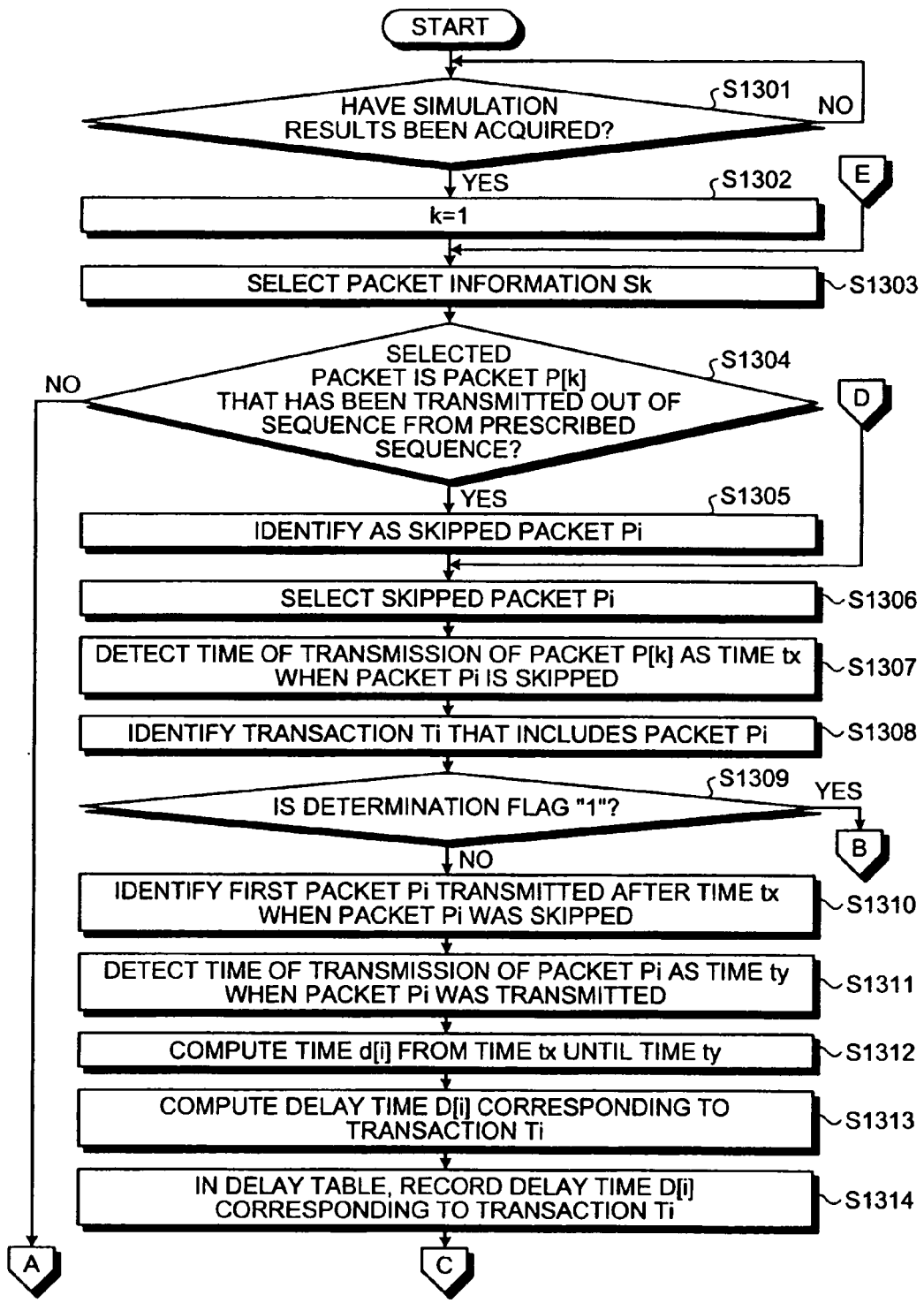
FIG. 13 is a flowchart of an example of verification support processing executed by the verification support apparatus according to the embodiment.
Figure 14:
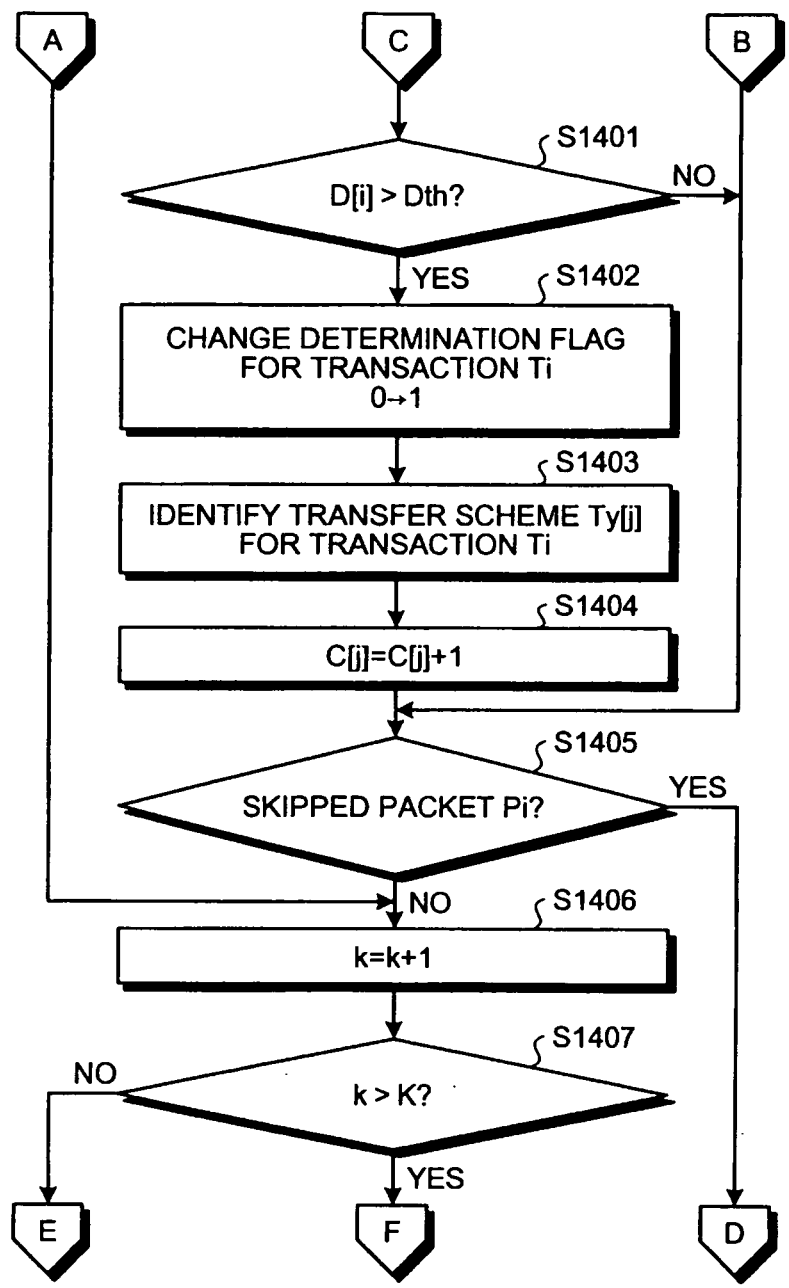
FIG. 14 is another flowchart of the example of the verification support processing executed by the verification support apparatus according to the embodiment.

FIGS. 13 to 15 are flowcharts of one example of the verification support processing executed by the verification support apparatus according to the embodiment. As depicted in the flowchart of FIG. 13, first, it is determined whether the acquisition unit 501 has acquired the simulation results 600 for the operation of the transmission source device 102 (step S1301).

Here, acquisition of the simulation results 600 is waited for (step S1301: NO). If the simulation results 600 have been acquired (step S1301: YES), the first detector unit 502 initializes k of packet information Sk to k=1 (step S1302) and from the simulation results 600, selects packet information Sk (step S1303).

The first detector unit 502 determines whether the packet Pi identified from the selected packet information Sk is a packet P[k] that has been transmitted out of sequence with respect to the prescribed sequence (step S1304). If the packet Pi is not a packet P[k] that has been transmitted out of sequence with respect to the prescribed sequence (step S1304: NO), the flow proceeds to step S1406 depicted in FIG. 14.

On the other hand, if the packet Pi is a packet P[k] that has been transmitted out of sequence with respect to the prescribed sequence (step S1304: YES), the first detector unit 502 identifies the skipped packet Pi, based on the simulation results 600 (step S1305). Then, the first detector unit 502 selects an arbitrary packet Pi from among identified skipped packets Pi (step S1306). The processing at step S1306 may identify multiple packets Pi that have been skipped.

The first detector unit 502 detects the time of the transmission of the packet P[k] as the time tx when the selected packet Pi was skipped (step S1307). Next, the second detector unit 503 identifies the transaction Ti that includes the packet Pi that has been skipped (step S1308).

The second detector unit 503 refers to the delay-time table 700 and determines whether the determination flag of the identified transaction Ti is "1" (step S1309). If the determination flag is "1" (step S1309: YES), the flow proceeds to step S1405 depicted in FIG. 14.

On the other hand, if the determination flag is "0" (step S1309: NO), the second detector unit 503 refers to the simulation results 600 and identifies the first packet Pi that is transmitted after the time tx when the packet Pi was skipped (step S1310).

The second detector unit 503 detects the time of the transmission of the identified packet Pi as the time ty when the packet Pi is transmitted (step S1311). Subsequently, the first computation unit 504 computes the time d[i] that elapsed from the time tx when the packet Pi was skipped until the time ty when the packet Pi was transmitted (step S1312).

The second computation unit 505 computes the delay time D[i] corresponding to the transaction Ti, by substituting the time d[i] calculated for the packet Pi into equation (2) above (step S1313). In equation (2), D[i] of the right term is identified from the delay-time table 700.

The second computation unit 505 records to the delay-time table 700, the delay time D[i] calculated for the transaction Ti (step S1314), and the flow proceeds to step S1401 depicted in FIG. 14.

As depicted in the flowchart of FIG. 14, the delay determination unit 506 refers to the delay-time table 700 and determines whether the delay time D[i] corresponding to the transaction Ti is greater than the threshold Dth (step S1401). If the delay time D[i] is equal to or less than the threshold Dth (step S1401: NO), the flow proceeds to step S1405.

On the other hand, if the delay time D[i] is greater than the threshold Dth (step S1401: YES), the delay determination unit 506 changes the determination flag that is included in the delay-time information 700-$i$ in the delay-time table 700, from "0" to "1" (step S1402). Next, the counter unit 507 identifies the transfer scheme Ty[j] of the transaction Ti that includes the skipped packet Pi selected at step S1306 (step S1403).

Then, the counter unit 507 increments, in the count table 800, the count C[j] for the transfer scheme Ty[j] (step S1404). Next, the first detector unit 502 determines whether there are any packets Pi that have not been selected at step S1306 (step S1405).

If an unselected packet Pi remains (step S1405: YES), the flow returns to step S1306. On the other hand, if no unselected packet Pi remains (step S1405: NO), the first detector unit 502 increments k of the packet information Sk (step S1406), and determines whether k is greater than K (step S1407).

If k is equal to or less than K (step S1407: NO), the flow returns to step S1303 depicted in FIG. 13. On the other hand, if k is greater than K (step S1407: YES), the flow proceeds to step S1501 depicted in FIG. 15.

As depicted in the flowchart of FIG. 15, first the third computation unit 508 refers to the count table 800 and computes the total count $C_{ALL}$, which is a summation of the counts C[1] to C[m]. Next, the third computation unit 508 initializes j of the transfer scheme Ty[j] to "j=1" (step S1502).

Subsequently, the third computation unit 508, using equation (4) above, computes the ratio R[j] of the count C[j] for the transfer scheme Ty[j] with respect to the total count $C_{ALL}$ (step S1503). Thereafter, the ratio determination unit 509 determines whether the computed ratio R[j] of the count C[j] for the transfer scheme Ty[j] is greater than the threshold Rth (step S1504).

If the ratio R[j] is less than or equal to the threshold Rth (step S1504: NO), the flow proceeds to step S1506. On the other hand, if the ratio R[j] is greater than the threshold Rth (step S1504: YES), the ratio determination unit 509 records to the delay list 900, the transfer scheme Ty [j] and the ratio R[j] (step S1505).

Next, the third computation unit 508 increments j of the transfer scheme Ty[j] (step S1506), and determines whether j is greater than m (step S1507). If j is less than or equal to m (step S1507: NO), the flow returns to step S1503. On the other hand, if j is greater than m (step S1507: YES), the output unit 510 outputs the delay list 900, ending the processing according to the flowchart.

As described, the verification support apparatus 101 enables detection of the time tx when a packet Pi of a transaction Ti, among transactions T1 to Tn that are to be transmitted cyclically in the prescribed sequence is skipped. Further, the verification support apparatus 101 enables detection of the time ty when the packet Pi is transmitted for the first time after the time tx when the packet Pi was skipped. The verification support apparatus 101 further enables computation of the time d[i], the time that elapses from the time tx when the packet Pi is skipped until the time ty when the packet Pi is transmitted. Thus, the delay time (i.e., the excess time consumed for commencement of the transmission of the packet Pi) consequent to the transmission source device 102 failing to transmit the packet Pi in the prescribed sequence can be identified.

The verification support apparatus 101 enables computation of the delay time D[i], by summing the times d[i] of packets Pi included a transaction Ti. Thus, the delay time (i.e., the excess time consumed for completion of the transmission for the transaction Ti) equivalent to the sum of the respective times d[i] of packets Pi that are skipped among packets Pi included in the transaction Ti, can be identified.

The verification support apparatus 101 enables determination of whether the delay time D[i] corresponding to a transaction Ti is greater than a threshold Dth. Thus, a transaction Ti having a delay time D[i] that exceeds a value (threshold Dth) allowed by the designer or customer can be identified.

The verification support apparatus 101 enables the number of delay times D[i] (respectively corresponding to transactions Ti) that have been determined to be greater than the threshold Dth, to be counted for each transfer scheme Ty[j]. Thus, the number (count C[j]) of transactions Ti having a delay time D[i] that is greater than the threshold Dth can be identified for each transfer scheme Ty[j].

The verification support apparatus 101 enables computation of the ratio R[j] of the count C[j] for the transfer scheme Ty[j], with respect to the total count $C_{ALL}$ and determination of whether the ratio R[j] is greater than a threshold Rth. Thus, among the transfer schemes Ty[1] to Ty[m], transfer schemes Ty[j] for which the count C[j] is relatively high can be identified, the count C[j] being indicative of the number of transactions Ti for which the delay time D[i] is greater than the threshold Dth.

Therefore, the verification support program, the verification support apparatus, and the verification support method enable support of verification work to identify causes of transaction Ti delays occurring with the transmission source device 102 and enable a reduction in the verification period for the transmission source device 102.

The verification support method described in the present embodiment may be implemented by executing a prepared program on a computer such as a personal computer and a workstation. The program is stored on a computer-readable, non-transitory medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein a verification support program that causes a computer to execute a procedure, the procedure comprising:
   detecting a point in time when data of any one transaction among a series of transactions that are to be transmitted in a prescribed sequence from a device under verification, is skipped;
   detecting a point in time when the data is first transmitted after the detected point in time when the data is skipped;
   computing time elapsing from the detected point in time when the data is skipped until the detected point in time when the data is transmitted; and
   outputting a computation result obtained at the computing.

2. The computer-readable, non-transitory medium according to claim 1, the procedure further comprising:
   calculating a delay time corresponding to a transaction, by summing, according to transaction, the time computed at the computing,
   wherein the outputting includes outputting a calculation result obtained at the calculating.

3. The computer-readable, non-transitory medium according to claim 2, the procedure further comprising:
   determining whether the calculated delay time corresponding to a transaction is greater than a given threshold, wherein
   the outputting includes outputting a determination result obtained at the determining.

4. The computer-readable, non-transitory medium according to claim 3, the procedure further comprising:
   counting, for each transfer scheme of transferring the transactions, the number of times the delay time corresponding to a transaction is determined to be greater than the threshold at the determining,
   wherein the outputting includes outputting a count obtained for each transfer scheme at the counting.

5. The computer-readable, non-transitory medium according to claim 4, the procedure further comprising:
   computing a ratio of each count, with respect to a total count that is a summation of the counts for the transfer schemes; and
   determining, for each ratio computed, whether the ratio is greater than a given threshold,
   wherein the outputting includes outputting a determination result obtained at the determining whether the ratio is greater than a given threshold.

6. A verification support apparatus comprising:
   a first detector unit that detects a point in time when data of any one transaction among a series of transactions that are to be transmitted in a prescribed sequence from a device under verification, is skipped;
   a second detector unit that detects a point in time when the data is first transmitted after the detected point in time when the data is skipped;
   a computation unit that computes time elapsing from the detected point in time when the data is skipped until the detected point in time when the data is transmitted; and
   an output unit that outputs a computation result obtained at the computing.

7. A verification support apparatus comprising:
   a hardware processor configured to execute a procedure, the procedure comprising:
      detecting a point in time when data of any one transaction among a series of transactions that are to be transmitted in a prescribed sequence from a device under verification, is skipped;
      detecting a point in time when the data is first transmitted after the detected point in time when the data is skipped;
      computing time elapsing from the detected point in time when the data is skipped until the detected point in time when the data is transmitted; and
      outputting a computation result obtained at the computing.

8. A verification support method executed by a computer, the method comprising:
   detecting, using the computer, a point in time when data of any one transaction among a series of transactions that are to be transmitted in a prescribed sequence from a device under verification, is skipped;
   detecting, using the computer, a point in time when the data is first transmitted after the detected point in time when the data is skipped;
   computing, using the computer, time elapsing from the detected point in time when the data is skipped until the detected point in time when the data is transmitted; and
   outputting, using the computer, a computation result obtained at the computing.

* * * * *